United States Patent [19]

Hingorani et al.

[11] Patent Number: 5,278,647

[45] Date of Patent: Jan. 11, 1994

[54] VIDEO DECODER USING ADAPTIVE MACROBLOCK LEAK SIGNALS

[75] Inventors: Rajesh Hingorani, Princeton Junction; Kim N. Matthews, Watchung, both of N.J.

[73] Assignee: AT&T Bell Laboratories, Murray Hill, N.J.

[21] Appl. No.: 926,079

[22] Filed: Aug. 5, 1992

[51] Int. Cl.⁵ .................... H04N 7/137; H04N 7/133; H04N 7/13
[52] U.S. Cl. .................................... 358/136; 358/133
[58] Field of Search ............... 358/136, 105, 133, 135; H04N 7/13, 7/133, 7/137

[56] References Cited

U.S. PATENT DOCUMENTS

| | | | |
|---|---|---|---|
| 5,083,206 | 1/1992 | Knauer et al. | 358/136 |
| 5,128,756 | 7/1992 | Johnston et al. | 358/133 |
| 5,134,475 | 7/1992 | Johnston et al. | 358/133 |
| 5,134,477 | 7/1992 | Knauer et al. | 358/136 |
| 5,136,377 | 8/1992 | Johnston et al. | 358/136 |

OTHER PUBLICATIONS

CCITT Recommendation H.261, Live Transmission on Non-Telephone Signals, Video Codec for Audiovisual Services at p×64 kbits/s, Geneva, pp. 5-6 (1990).

*Primary Examiner*—Tommy P. Chin
*Assistant Examiner*—Bryan S. Tung
*Attorney, Agent, or Firm*—Jason P. Demont

[57] ABSTRACT

A decoder for a modified and improved MPEG signal syntax includes a subtractor responsive to an input signal, a frame buffer responsive to the subtractor, a motion compensator responsive to the buffer and to applied motion vector signals, and a multiplier responsive to frame leak signals and to a modified prediction signal for developing an output signal applied to the subtractor. Furthermore, the decoder includes a processor responsive to the motion compensator and to applied adaptive macroblock leak signals for developing the modified prediction signal. The processor comprises a transform circuit responsive to the motion compensator, a gating template responsive to the transform circuit and the adaptive macroblock leak signals, and an inverse transform circuit responsive to the gating template. The transform circuit operates on 2×2 blocks of pixels to form 2×2 blocks of transform elements. The gating template is responsive to signals that specify a treatment for 2×2 blocks of transform elements.

8 Claims, 2 Drawing Sheets

VIDEO DECODER USING ADAPTIVE MACROBLOCK LEAK SIGNALS

FIELD OF THE INVENTION

The present invention relates to the processing of video signals in general, and more particularly, to an apparatus for decoding video signals which are encoded in accordance with a predictive coding scheme.

BACKGROUND OF THE INVENTION

The following co-pending patent applications are hereby incorporated by reference: U.S. patent application Ser. No. 07/626,355, filed Dec. 11, 1990; U.S. patent application Ser. No. 07/785,671 filed Oct. 31, 1991; U.S. patent application Ser. No. 07/817,206 filed Jan. 6, 1992; and pending U.S. patent application entitled An Improved Adaptive Leak HDTV Encoder.

In U.S. patent application Ser. No. 07/625,355 an encoding scheme is disclosed together with a corresponding decoder. The disclosed encoding and decoding is proposed for a terrestrial high definition television ("HDTV") environment in the United States, but the disclosed principles have much broader applicability.

To briefly describe the disclosed arrangement, the input signal to be encoded is, for example, a video signal that comprises a concatenation of signal segments that correspond to signals that make up an image frame. That signal is evaluated in a forward estimation portion of the encoder and various parameters are developed by that evaluation. Thereafter, with the aid of the developed parameters, the signal is encoded and thereby substantially compressed, buffered, modulated and finally transmitted to the decoder (e.g., an HDTV receiver). Some of the parameters developed in the forward estimation portion of the encoder are also transmitted to the decoder, including motion vectors and image mean signals. In accordance with the teaching of U.S. patent application Ser. No. 07/625,355, the signals transmitted by the encoding portion comprise scale factor signals, quantized vector signals and vector codebook identifier signals.

In carrying out the differential encoding process, the encoder must be aware of the signals that the target receiver has, in order for the encoder to take account of whatever encoding/decoding errors are introduced by the process and cannot be avoided. To that end, the encoder includes a frame buffer which is populated with signals which are derived from the encoded signals created by the encoder.

At the decoder (i.e., at the receiver) the received signals are decoded with the aid of a frame buffer which maintains the previously decoded signals. The frame buffer within the decoder corresponds to the aforementioned frame buffer within the encoder.

One problem with this approach, when strictly executed, is that errors introduced into the signal following the encoding process show up in the decoder's frame buffer and do not disappear. To ameliorate this potential problem, the disclosed encoder arrangement introduces a signal leak. That is, the encoder does not encode the difference between the current frame and a prediction of the current frame derived from the previous frame which is stored in the frame buffer. Rather, the signal which is encoded is the difference between the current frame and *only a fraction* of the prediction frame. In effect, a portion of the current frame is encoded, because it is not nullified by the prediction frame. That portion, called the "leak", is controlled in accordance with image characteristics and other parameters that relate to the encoder's operation. The actual control is realized by providing what effectively is a multiplication circuit responsive to the output of the frame buffer, which circuit multiplies its applied signals by a fraction. The leak signal is also transmitted to the decoder.

In pending U.S. patent application entitled An Improved Adaptive Leak HDTV Encoder it is also disclosed that the encoder includes an output buffer. In order to maintain a constant delay between the encoder's input signal and the decoder's output signal, it is important to know the level of fullness of the encoder's output buffer (e.g., in terms of the number of image frames stored therein). Accordingly, pending U.S. patent application entitled An Improved Adaptive Leak HDTV Encoder discloses an encoder that also transmits an output buffer fullness control signal.

The arrangement described above works well in that an injected perturbation, such as transmission noise entering the frame buffer, is removed within a number of image frames by virtue of the multiplication-by-a-fraction process that occurs at the output of the frame buffer. Still, such perturbations are not welcome, and whenever there is a priori information that such a perturbation is about to manifest itself, it would be beneficial to overcome it quickly.

The effects of perturbations are mitigated by reducing the time needed to converge the decoder's prediction signal to that of the encoder. This is accomplished by temporarily altering the leak factor when it is known that a perturbation is about to manifest itself and by, in some situations, altering the incoming encoded signal. In particular, when a decoder tuned to a particular encoder is directed to receive the signals of a different encoder (e.g., a channel change on an HDTV receiver), the incoming leak factor signal is set to 0 for one frame. During that frame, signals that are applied to the decoder are multiplied by a factor related to the incoming leak factor (as long as the incoming leak factor is not equal to 1).

In addition to the subject matter disclosed in the aforementioned patent applications, there exist two other schemata for developing a digital signal corresponding to motion video: MPEG-I and MPEG-II.

MPEG-I is an arrangement for encoding a sequence of images employing progressive scanning. The salient characteristic of this arrangement is that there are three different encoding approaches which may be applied to a video frame. One approach is to encode the frame directly. Such a frame is typically called an "I" frame, where "I" stands for "intra" coding to designate that the encoding relies solely on information within the frame. A second approach is to encode the frame based on a prediction derived from a prior "I" frame, or from a prior frame encoded by this second approach. This prediction is somewhat similar to the prediction described in the aforementioned HDTV applications. Such frames are typically called "P" frames. The third approach is to encode the frame based on a prediction from an adjacent "I" frame, an adjacent "P" frame, or both. Such frames are typically called "B" frames. An "I" frame essentially resets the decoder, since "I" frame information completely describes the video image independent of other frames. MPEG-I specifies that the distance between "I" frames is fixed. MPEG-I also specifies the distance between "P" frames.

The MPEG-I approach incorporates a particular hierarchical signalling syntax. At the top of hierarchy is a Sequence Layer. Subsequent layers in sequence are Group of Pictures Layer, Picture Layer, Slice Layer, Macroblock Layer, and Block Layer. The important aspect of the MPEG syntax that should be noted is that information in the Block Layer and the Macroblock Layer relates to specific size blocks of video that have been properly encoded (i.e., 16×16 pixel macroblocks).

The MPEG-II approach is designed to handle field-interlaced motion video. In MPEG-II, the two fields to be encoded can be combined to form a single frame or they can be concatenated. The prediction operation which is carried out in the field-interlaced signal can make use of a corresponding field in the previous frame or the second field of the same frame.

Both MPEG approaches require a decoder which is reasonably substantial—particularly with regard to size of the buffer needed by the decoder. For example, in accordance with the MPEG approaches described above, this buffer must contain the information of at least 2 ½ frames of motion video. Since memory is expensive, the complexity of the present decoders may be disadvantageous is some circumstances.

SUMMARY OF THE INVENTION

In accordance with the present invention, the HDTV signal encoding described above is modified, improved and adapted to the MPEG signal syntax. In particular, the "B" frames are eliminated, thereby allowing the use of only "P" frames. In this sense, the resulting character of the encoded frames is much like that of the HDTV signal encoding. In addition, since a key aspect of the MPEG syntax is the specification of macroblocks and blocks, this invention enhances the MPEG coding prediction operations by including a macroblock-based leak signal in addition to the frame-based leak signal. Specifically, the macroblock-based signal is adaptively set based on the spatial frequency components of the macroblock signals.

DETAILED DESCRIPTION

Figure 1:
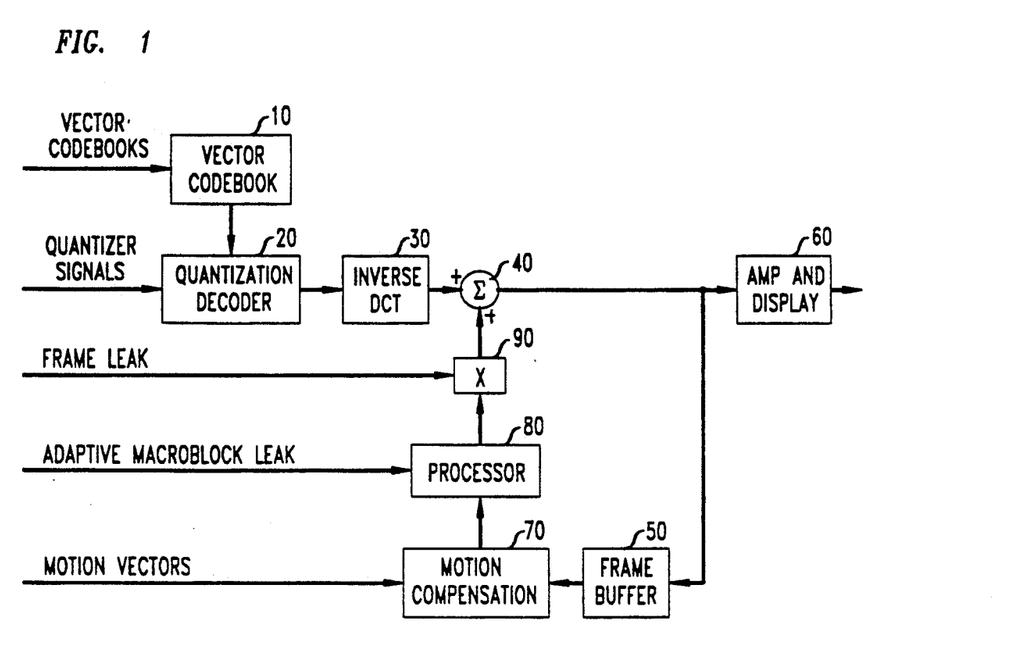
FIG. 1 depicts in block diagram form a decoder in conformance with the principles of this invention.

FIG. 1 presents a block diagram of an illustrative digital TV decoder in accordance with the present invention. The input signals to this decoder are vector codebook index signals and associated quantized signals, frame leak signals, adaptive macroblock leak signals, and motion vectors. The means for developing these signals from the signals received by the decoder are not shown because they form no part of this invention and are well known to those of ordinary skill in the art.

The vector codebook index signals are applied to vector codebook block 10, while the quantized signals are applied to quantization decoder 20. Quantization decoder 20 is responsive to vector codebook 10 to produce transform signals that are applied to inverse DCT transform block 30. The output of block 30 is applied to a positive input of adder 40, and the output of adder 40 is applied to frame buffer 50 and to amplifier and display means 60. The amplifier and display means 60 is a conventional element that forms no part of this invention.

The output of frame buffer 50 is applied to motion compensation circuit 70 which is responsive to the incoming motion vectors. The output of motion compensation block 70 is, in effect, a prediction of the signal developed by inverse DCT block 30. This prediction is processed by processor 80 in response to the received adaptive macroblock leak signals. The output of processor 80 is applied to multiplier 90 which, in cooperation with the frame leak signals, develops a filtered prediction signal that is applied to a second input of adder 40.

The structure and operation of the various elements described in connection with FIG. 1—save for processor 80—have been described in the aforementioned applications, which are hereby incorporated by reference.

Figure 2:
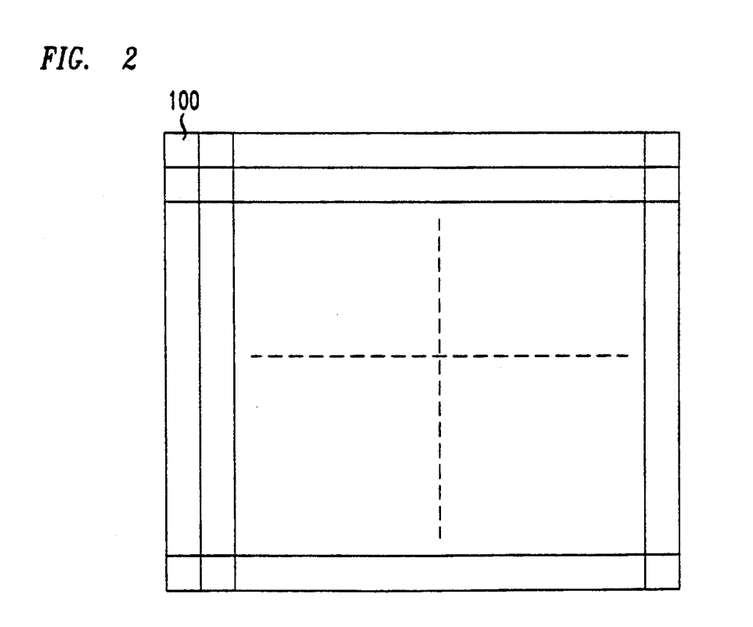
FIG. 2 illustrates division of a video image into macroblocks.

FIG. 2 depicts the division of an image into macroblocks. Each macroblock, such as macroblock 100, is 16 pixels wide and 16 pixels high in accordance with MPEG standards. This 16×16 macroblock can be divided into four 8×8 blocks. The adaptive macroblock leak signals define the operation performed by processor 80 of FIG. 1 on each macroblock. The operation is tantamount to a transformation, filtering, and an inverse transformation, as depicted in FIG. 3.

Figure 3:
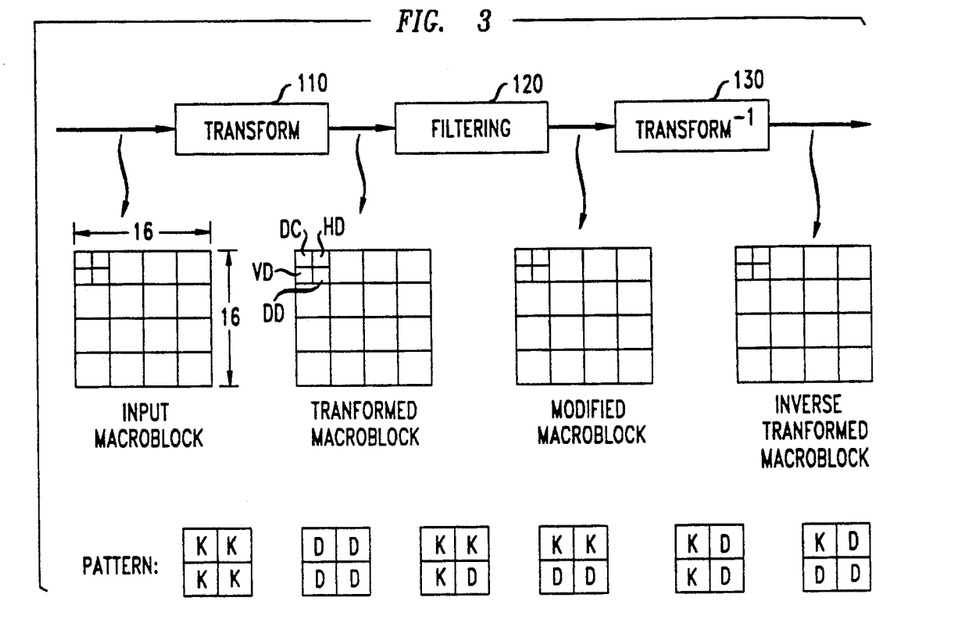
FIG. 3 describes the operations within the processor shown in FIG. 1.

In FIG. 3, the input to transform means 110 is shown to be a 16×16 macroblock comprising 16 separate 4×4 microblocks. The output of transform means 110 is also a 16×16 macroblock made up of 16 4×4 microblocks, but each element in the microblock is different from a corresponding element at the input of transform means 110. Specifically, the upper left hand element of a microblock at the output of means 110 equals the sum of the four microblock elements (pixels) in the corresponding microblock at the input of means 110. That is, if "a" is the element in the upper left corner, "b" is the element in the upper right corner, "c" is the element in the lower left corner and "d" is the element in the lower right corner, then the upper left hand element of a microblock at the output of means 110 equals $a+b+c+d$. The upper right hand element of a microblock at the output of means 110 equals the sum of the horizontal differences between the four pixels in the corresponding block at the input of means 110, i.e., $(a-b)+(c-d)$. The lower left hand element of a microblock at the output of means 110 equals the sum of the vertical differences between the four pixels in the corresponding block at the input of means 110; i.e., $(a-c)+(b-d)$. Lastly, the lower right hand element of a microblock at the output of means 110 equals the sum of the diagonal differences between the four pixels in the corresponding block at the input of means 110; i.e., $(a-b)-(c-d)$.

Filtering means 120 which follows means 110 merely selects one of six patterns to replace the microblocks developed by means 110. Each one of the microblock patterns shown in FIG. 3 specifies whether an element is kept (K) or is dropped (D). In the decoder of FIG. 1, information about the patterns employed in filtering means 120 is provided by the adaptive macroblock leak signals. Thus, the collection of the adaptive macroblock leak signals applied to filter means 120 forms, in effect, a template that either passes the signals developed by transform means 110 or blocks those signals. The result is a modified transformed macroblock at the output of filter means 120. The modified transformed macroblock at the output of filtering means 120 is applied to inverse transform means 130. Means 130 performs the inverse of the transform carried out in means 110.

The function performed by processor 80 is exactly the function of means 110, 120, and 130. Processor 80 may be implemented in hardware by the use of special purpose processors to perform the additions and subtractions necessary within means 110 and 130 and the gating necessary within means 120. Alternatively, processor 80 may be implemented in a general purpose microprocessor of conventional design, responsive to software that carries out the functions described above.

The choice of which pattern should be used can be made by comparing the variance of the original image data and the variance of the displaced frame difference (i.e. the difference between the original and the prediction) for each of the four frequency subbands over the macroblock. In this case, the 64 DC components of the original image are squared and summed and compared with the sum of the squares of the 64 DC components of the DFD. If the original variance is less than a constant multiplied by the DFD variance, the leak for the DC component of this macroblock is set to drop and the original data is selected for transmission.

In order to reduce the number of possible combinations of the 4 frequency leak factors ($2^4$ or 16 possible), it is noted that if the lower frequency subbands are poorly predicted, it can be assumed that the higher frequency subbands will also be poorly predicted and can set to drop (e.g. if vertical or horizontal are drop, diagonal is also set to drop. If DC is dropped, all the remaining 3 subbands are dropped.) This reduced the possible combinations to 6.

This decision can be made either in the forward estimator (where the prediction is generated by motion compensating the original images), or on the actual preduction within the encoder loop, which is generally more accurate.

As described above, this invention simplifies the decoder by eliminating the distinction between different types of frame encoding and by reducing the size of the necessary buffer. In addition, the simplification that this invention introduces serves to also simplify the signal syntax. The following text describes in detail the syntax modifications to MPEG, which is dubbed MPEG-EP. It is intended for broadcast applications, and could be a restricted version of MPEG-II, that allows relatively inexpensive decoding.

An MPEG-EP decoder would use a single frame of memory for reference picture storage, and would not use bidirectional prediction. It would support both the field picture and frame picture coding modes, proposed for MPEG-II. While imposing some constraints on MPEG-II, to allow for inexpensive decoders, the entertainment profile also adds some features to MPEG-II, for improved picture quality. MPEG-EP supports the use of both field leaks and a local spatial frequency adaptive leak for improved picture quality and robust performance in the presence of noise. The encoder can choose to improve the motion prediction of a macroblock by transmitting motion vectors for each of the four luma blocks comprising the 16×16 macroblock. A similar escape mode is available for allowing different quantizers to be applied to each of the blocks of a macroblock. A new macroblock coding mode is used in MPEG-EP, which offers some advantages over the traditional run-length coding mode of MPEG.

MPEG-EP Features

MPEG-EP is intended to be used for broadcast entertainment applications. The input to an MPEG-EP system is CCIR 601 images. The encoder would crop the input frames to a size 704×480 for coding. The encoder, could optionally, subsample the image horizontally by a factor of 2 (in both luma and chroma), and code the resulting 352×480 image sequence. An MPEG-EP decoder should therefore support at least both these image sizes. In addition, both 4:2:0, and 4:2:2 chroma coding should be supported.

The most important constraint in broadcast applications is the availability of cheap decoders. Decoder memory is still a relatively expensive resource, and MPEG-EP decoders would use a single frame of memory for the storage of reference pictures. MPEG-EP sets M=1, in the MPEG model, so that B pictures are not permitted. This reduces memory requirements at the decoder, and the end-to-end delay, because the transmission order is the same as the display order. It also allows a smaller motion estimation range to be used at the encoder, because motion prediction is applied consecutive fields or frames. MPEG-EP supports both frame coding and field coding through the frame picture and field picture structures of MPEG-II. In the case of frame coding, both the motion compensation and the DCT transform can be applied in either frame or field mode.

MPEG-EP provides for leaked prediction capability in "P" pictures. A global field leak and field leak modifier are transmitted at the picture layer, and used to modify the final prediction. "P" pictures also allow the use of a spatially adaptive spatial frequency based leaks as disclosed above. The use of this feature in a picture is indicated by a flag included at the picture layer.

MPEG-EP adds two escape modes for greater adaptivity and improved picture quality. The first escape mode, permits the use of different motion vectors for the four 8×8 luma blocks comprising a macroblock, while the second allows different quantizer values to be used for quantizing the blocks of a macroblock. The use of either of the two escape modes in a picture (slice) is indicated through two flags at the picture layer (slice layer), thus avoiding macroblock level overhead in the event they are not used in the picture (slice).

MPEG-EP replaces the run length coding employed in MPEG by a new form of coefficient encoding. In MPEG-EP, a perceptually optimized codebook is used to determine which coefficients of the macroblock are to be transmitted. Information about the pattern of coefficients transmitted is communicated to the decoder through a selection vector. The coefficients selected for transmission can be transmitted using a set of coefficient VLC tables.

Layered Structure of Video Data

Sequence Layer—A "sequence" consists of one or concatenated groups of pictures.

Group of Pictures Layer—A "Group of Pictures" consists of one or more consecutive pictures. For MPEG-EP, the display order is the same as the order in which the pictures appear in the coded stream. The requirement that the first frame of a group of pictures be an "I" picture is removed in MPEG-EP.

Picture Layer—A "Picture" is either a frame picture or a field picture. A frame picture is constructed by combining two consecutive fields. The top line in a frame is in the first temporal field of the frame. A field picture is formed of two fields transmitted in a successive order. A picture header is transmitted before each field of a field picture. For field pictures, field 1 can be used as reference picture for the prediction of field 2.

Slice Layer—In MPEG, a "Slice" consists of a variable number of macroblocks.

Figure 4:
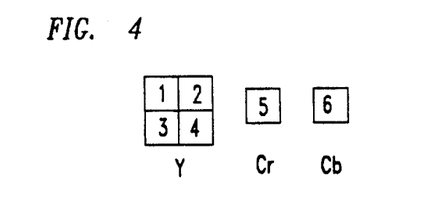
FIG. 4 illustrates the 4:2:0 macroblock structure.
Figure 5:
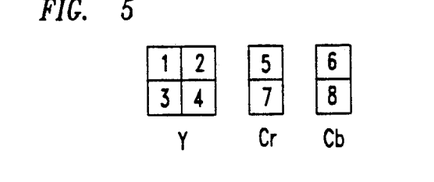
FIG. 5 illustrates the 4:2:2 macroblock structure.

Macroblock Layer—The "Macroblock" size is 16×16 in luma pels, irrespective of picture mode (field or frame). The structure and order of blocks in 4:2:0 and 4:2:2 macroblocks is shown in FIG. 4 and FIG. 5, respectively.

Motion Estimation and Compensation

All motion vectors are estimated and used with half pel accuracy for MPEG-EP.

Frame Mode—A given macroblock in a frame picture may be predicted using a single frame motion vector, or two field motion vectors. When two field motion vectors are used for the prediction of a macroblock, one corresponds to the 16×8 pixels of the macroblock that come from field 1 and the other to the remaining 16×8 pixels of the macroblock that come from field 2. An efficient algorithm for joint motion estimation of the field/frame motion vectors for a macroblock is described in *Test Model 1, Draft Revision* 1 MPEG Document 92/160, Haifa, Israel, May 1992.

Field Mode—Field based motion vectors are expressed in the very same way as frame-based vectors would be if the source (reference) field and the destination field were considered as frames. Details can be found in *Test Model 2 Draft Revision* 2 MPEG Document AVC-, Rio De Janeiro, Brazil, July 1992. A motion vertical field select flag is transmitted to identify the selected reference field the motion vector applies to. When a field motion vector is generated for the 16×8 submacroblock of a field, in frame picture mode, the two reference fields are fields 1 and 2 of the previous frame; while a field motion vector in field picture mode refers to the two previous fields. Therefore, for the case of a macroblock from field 2 of a field picture, the motion vertical field select flag selects between field 1 of the same frame or field 2 of the prior frame.

The manner in which these motion vectors are applied to chroma is described in *Test Model 2 Draft Revision* 2 MPEG Document AVC-, Rio De Janeiro, Brazil, July 1992.

When the motion escape mode is used the difference between the motion vectors for 8×8 blocks and the corresponding frame or field macroblock motion vector is transmitted.

For MPEG-EP, a search range of ±31 should be adequate for most sequences.

Leaked Prediction—Adaptive Spatial Frequency Based Leak—

The motion-compensated prediction of a block can be modified in two ways before it is used. First, a spatial frequency based leak (can also be considered as an adaptive loop filter) can be applied to the block. The spatial frequency leak filters the 8×8 prediction by decomposing it into four sub-bands using a 2×2 Hadamard transform, selectively dropping some of the bands (by zeroing them out), and then reconstructing the filtered block using an inverse Hadamard transform. Of the sixteen ($2^4$) keep/drop combinations available only four are allowed. These are shown in Table 1. It should be noted that the "keep all" combination corresponds to not filtering, and "drop all" corresponds to intra coding of the block.

TABLE 1

| | Macroblock Frequency Leak | | | |
|---|---|---|---|---|
| Code | Lo-Lo | Lo-Hi | Hi-Lo | Hi-Hi |
| 00 | Keep | Drop | Drop | Drop |
| 01 | Keep | Keep | Drop | Drop |
| 10 | Keep | Drop | Keep | Drop |
| 11 | Keep | Keep | Keep | Drop |

The frequency based leak can be enabled at the picture layer using the picture frequency leak flag. If enabled, a leaked macroblock flag is transmitted for a non-intra macroblock. If the flag is set the next two bits macroblock leak indicate the mode of filtering used.

Leaked Prediction—Field Leak—

After the spatially adaptive frequency leak has been applied to the macroblock, the global field leak is applied to the prediction. The field leak modifier is added to the predicted value, and is shifted right by an amount indicated by the field leak, and then subtracted from the original predicted value to obtain the leaked prediction. The field leak modifier helps to correctly synchronize the receiver with the transmitter. It effectively dithers the origin of the leak function over time. The range of values through which the modifier is required to cycle is determined by the attenuation factor. For attenuation of $\frac{7}{8}$, the modifier must range between 0 and 7, for 15/16 the modifier is between 0 and 15 and so on. The possible values for the field leak are shown in Table 2.

TABLE 2

| | Field Leak |
|---|---|
| Code | Attenuation factor |
| 000 | Reserved |
| 001 | 1.0 |
| 010 | 7/8 |
| 011 | 15/16 |
| 100 | 31/32 |
| 111 | 63/64 |
| 111 | 0.0 |

Macroblock Types in a Predicted Picture—In predicted frames/fields the allowed macroblock types are Motion Compensation Coded;

No Motion Compensation Coded (This normally means a zero motion vector in frame mode. In field mode it should mean zero motion vector with respect to a field with the same polarity as the field of the block being predicted. The same is true for a skipped macroblock in field pictures);

Motion Compensation Not Coded;

Intra;

Motion Compensation Coded with Modified Quantizer

No motion Compensation Coded with Modified Quantizer

Intra with Modified Quantizer

Independent of the macroblock type a field/frame DCT coding, field/frame motion vector prediction (for frame pictures) are included in the bit stream. For pictures where the quantization escape mode has been enabled, a macroblock quantizer escape flag is included. For pictures where the motion escape mode has been enabled, a macroblock motion escape flag is included for non-intra macroblocks. For pictures where the frequency leak has been enabled, a leaked macroblock flag is included for non-intra macroblocks.

Field/Frame DCT Coding Decision—Field based DCT coding is used for a macroblock in frame picture mode. The decision is based on a comparison of interline correlation for the macroblock in both field and frame modes (Caveat: The inequality in the algorithm described in section 6.5.6 of *Test Model 2 Draft Revision 2 MPEG Document AVC-*, Rio De Janeiro, Brazil, July 1992 should be reversed). When 4:2:2 chroma is used, the chrominance blocks are coded are coded in the same manner as the luma blocks. For 4:2:0, the chroma is always frame coded.

Transformation and Quantization—An $8 \times 8$ DCT transform is used and may be applied to a field block or a frame block in frame picture mode.

In MPEG-EP the transform coefficients are sent to a selection process that decides which coefficients are to be transmitted after quantization. The selection process makes this decision based on buffer fullness, perceptual criteria, and the quantization error. Dropped coefficients are set to zero, while transmitted coefficients, are quantized as they are in MPEG-I. A uniform quantizer, without a dead-zone is used for intra coefficients, while a uniform quantizer with a dead zone about zero is used for coefficients of non-intra blocks. Thompson Consumer Electronics, MPEG-II Proposal to extend escape range to 12 bits and intra DC precision to 9 bits, MPEG Document 92/408, Rio de Janeiro, Brazil, July 1992. This would help improve picture quality for images, where the bit rate is not a limitation, for example, on stills and on other easily coded images. This should be included in MPEG-EP. The selection process selects coefficients for transmission with reference to a predefined codebook of stored patterns. It finds the pattern which is "optimal" in the sense that it minimizes distortion and the number of bits required to code the block based on a particular cost function. The codebook of selection patterns is available at the decoder, and the encoder transmits the selection vectors to identify the pattern selected. The coefficients to be transmitted are then coded using a set of variable length codes.

Coding—VLC table optimization and specification of MPEG-EP code tables will be done at a later date.

Macroblock Address and Type—Macroblock address and type are coded as they are for MPEG-I.

Motion Vectors—Motion vectors are coded differentially within a macroblock slice, obeying the following rules:

Every motion vector is coded relative to the last vector. Each component of the vector is coded independently, the horizontal component first, and then the vertical component.

Prediction motion vector is set to zero at the start of a macroblock slice, or if the last macroblock was coded in intra mode. (Note: A no MC decision corresponds to a reset to zero of the prediction motion vector).

The differential value is coded using the same tables as used for MPEG-I.

Two separate chains of predictors are maintained for the prediction of field based motion vectors, one for motion vector prediction from field 1 (PMV1), the other for motion vector prediction from field 2 (PMV2). In frame picture mode, PMV1 is used for frame type motion vectors, and PMV2 is set equal to PMV1. All prediction motion vectors are expressed in Frame coordinates. Details on motion vector prediction may be found in Appendix J of *Test Model 2 Draft Revision 2 MPEG Document AVC-*, Rio De Janeiro, Brazil, July 1992.

$8 \times 8$ motion vectors are coded differentially with respect to the corresponding macroblock motion vector. They do not affect the prediction chain of the macroblock motion vectors.

Selection Vectors—For each of the three color components of a coded macroblock, the encoder transmits one or more selection vectors to identify the transmitted coefficients within the macroblock. A selection vector is an index into a predefined table of patterns, that represents which coefficients of a transformed $8 \times 8$ block are transmitted. Different tables exist for frame/field coding, luma/chroma, and different chroma modes (4:2:0, 4:2:2). The macroblock coding mode (frame/field), determines the tables used for pattern selection. Selection vectors are coded using VLC codes corresponding to the tables for each of the three components.

Normally one selection vector is transmitted for each of the three color components of a macroblock. The vector applies to each of the blocks in the macroblock of the corresponding component. However, using an escape selection vector, it is possible to transmit one selection vector per $8 \times 8$ block, of the corresponding component, in the macroblock. The escape mode is enabled through the use of the selection escape flag.

Coding of Transform Coefficients—The selection vector identifies the transmitted coefficients for each of the blocks in the macroblock. Each coefficient is coded using the coefficient VLC table.

Specification of the Coded Bit Stream

This section describes one possible syntax for the coded bit stream for MPEG-EP. It follows the same conventions as the MPEG-II TM documents. However, since B pictures are not permitted, some data units that would never occur in an MPEG-EP stream are not shown.

Start Codes—Start code syntax is the same as for MPEG-I.

TABLE 3

| START CODE SYNTAX | |
|---|---|
| Start Code | Hex value |
| picture start code | 00000100 |
| slice start codes | 00000101 |
| including slice VP | 00000102 through 000001AF |
| reserved | 000001B0 |
| reserved | 000001B1 |
| user data start code | 000001B2 |
| sequence header code | 000001B3 |
| sequence error code | 000001B4 |
| extension start code | 000001B5 |
| reserved | 000001B6 |
| sequence end code | 000001B7 |
| group start code | 000001B8 |
| system start codes | 000001B9 through 000001FF |

Video Sequence Layer—This remains unchanged from the MPEG-II TM documents.

Group of Pictures—This remains unchanged from the MPEG-II TM documents.

| PICTURE LAYER | |
|---|---|
| picture() | |
| { | |
| Picture Start Code | 32 bits bslbf |
| Temporal Reference | 10 uimsbf |
| Picture Coding Type | 3 uimsbf |
| buffer delay | 16 uimsbf |

```
if (picture coding type == "P", or "B") {
  if (picture coding type == "P") {
    full pel forward vector                       1
    forward f code                                3     uimsbf
  }
  if (picture coding type == "B") {
    full pel backward vector                      1
    backward f code                               3     uimsbf
  }
  while (nextbits() == '1') {
    extra bit picture                             1     "1"
    extra information picture                     8
  }
  extra bit picture                               1     "0"
  next_start_code()
  if (nextbits() == extension start code) {
    extension start code                         32     bslbf
    picture structure                                   uimsbf
    forward reference fields                      2     uimsbf
    backward reference fields                     2     uimsbf
    chroma postprocessing type                    1     uimsbf
    picture subsample                             1     uimsbf
    chroma format                                 1     uimsbf
    picture motion escape                         1     uimsbf
    picture quant escape                          1     uimsbf
    if (picture coding type == 'P') {
      field leak                                  3     uimsbf
      field leak modifier                         6     uimsbf
    }
    picture frequency leak                        1     uimsbf
    load intra quantizer matrix                   1     uimsbf
    if (load intra quantizer matrix)
      intra quantizer matrix[64]               8*64     uimsbf
    if (load intra quantizer matrix)
      inter quantizer matrix[64]               8*64     uimsbf
    tcoef escape format                           1     uimsbf
    intra dc format                               1     uimsbf
    while (nextbits() != start_code) {
      picture extension data                      8
    }
    next_start_code()
  }
  if (nextbits() == user data start code) {
    user data start code                         32     bslbf
    while (nextbits() != start_code) {
      user data                                   8
    }
    next_start_code()
  }
  do {
    slice()
  } while (nextbits == slice start code)
}
```

SLICE LAYER

```
slice ()
{
  slice start code                            32 bits  bslbf
  quantizer scale                                 5     uimsbf
  while (nextbits() == '1') {
    extra bit slice                             1     "1"
    extra information slice                     8
  }
  extra bit slice                               1     "0"
  do {
    macroblock()
  } while (nextbits() != start code prefix (23 zeros))
  next_start_code
}
```

MACROBLOCK LAYER

```
macroblock()
{
  while (nextbits() == "0000 0001 111")
    macroblock stuffing                      11 bits  vlclbf
  while (nextbits() == "0000 0001 000")
    macroblock escape                        11 bits  vlclf
  macroblock address increment                1-11    vlclbf
  macroblock type                             1-6     vlclbf
  if (macroblock motion forward)
    if (picture structure == frame) {
      frame motion type                       1       uimsbf
  if (picture structure == frame &&
      (macroblock intra||macroblock coded))
```

```
  dct type                                      1     uimsbf
  if (macroblock quant)
    quantizer scale                             5     uimsbf
  if (macroblock motion forward)
    motion_vectors()
  if (picture frequency leak && !macroblock intra) {
    leaked macroblock                           1     uimsbf
    if (leaked macroblock)
      macroblock leak                           2     uimsbf
  }
  if (picture motion escape && !macroblock intra) {
    macroblock motion escape                    1     uimsbf
    if (macroblock motion escape)
      8x8_motion_vectors()
  }
  if (picture quant escape) {
    macroblock quant escape                     1     uimsbf
    if (macroblock quant escape)
      8x8_quants()
  }
  if (intra||coded) {
    luma_selection_vector()
    Cr_selection_vector()
    Cb_selection_vector()
  }
  for (i=0; i<block count; i++)
    block(i)
  if(picture type == "D")
    end of macroblock                           1     "1"
}
motion_vector²
{
  motion horizontal code                      1-11   vlclbf
  if (horizontal f != 1 && motion horizontal code !=
    0))
      motion horizontal r                     1-6    uimsbf
  motion vertical code                        1-11   vlclbf
  if (vertical f != 1 && motion code != 0))
      motion vertical r                       1-6    uimsbf
}
field_motion_vector()
{
  motion vertical field select                  1     uimsbf
  motion_vector()                             1-6    uimsbf
}
motion_vectors()
{
  if (picture structure != frame structure ||
    mv format == frame) {
    if (picture structure != frame structure)
      field_motion_vector()
    else
      motion_vector()
  } else {
    field_motion_vector_1()
    field_motion_vector_2()
  }
}
```

BLOCK LAYER

```
block(i)
{
  for (k=0; k<64; kp++) {
    if (transmitted[i][k])
      dct coeff                                       tbd vlclbf
  }
}
```

Semantic Meaning of Retrieved Data Elements

Video Sequence Layer and Group of Pictures Layer—These two layers are not needed for MPEG-EP and could be eliminated in MPEG-EP. The picture sizes and chroma format allow only two choices for each, and these may be moved from the sequence layer to the picture layer. The decoder buffer size could be fixed for a specific application. The quantizer matrices should also be moved to the picture layer. One of the reasons for this is that we would like the decoder to begin decoding at a picture start code, rather than have to wait for a sequence start code. This is important for the ability to change channel's at the decoder.

It should be noted that removal of the sequence and GOP layer does not save very much in terms of overhead. If compatibility is an important issue, they could be maintained.

If nonstandard quantizer matrices are used quite often, then the overhead at picture layer of transmitting these for every frame/field may become significant (upto 60×64×8×2=60Kbits/sec). In such cases it would be desirable to send these matrices less frequently, maybe once every 4 frames or fields. We can achieve this by introducing a flag at the picture layer to indicate whether default quantizer matrices or custom quantizer matrices are used. If custom matrices are used, they may be repeated once every n frames/fields. Their absence or presence is indicated by the load quantizer matrix flag. A decoder doing a channel change, would check the custom quantization flag. If it is off, the decoder can begin decoding the picture using the default quantizer matrices. If the custom quantization flag is on, the decoder would check for the presence of the load quantizer matrix flags. If they were available for the current picture, it could commence decoding, otherwise it waits till it finds a picture where they are transmitted.

Picture Layer—The picture type is transmitted as part of the picture layer information. The size of the picture can be determined from the picture subsample flag which is '1' for pictures with 352 pixels/line, and '0' for pictures with 704 pixels/line. The chroma format flag indicates whether 4:2:0 ('1'), or 4:2:2 ('0') subsampling is used. The picture structure field indicates the picture mode as shown in Table 4:

TABLE 4

| | Picture Structure |
|---|---|
| 11 | Frame Picture |
| 10 | Field 1 of a Field Picture |
| 01 | Field 2 of a Field Picture |
| 00 | reserved |

Some of the other fields at the picture layer, will either never occur: full pel backward vector and backward f code; or do not convey any information for MPEG-EP: backward reference fields, chroma post processing type, etc. These could be eliminated if necessary, or maintained for overall MPEG compatibility.

Included in the picture layer are the following additional flags: repeat prior field flag or a film mode flag will also be needed to support 3:2 pulldown at the decoder:

picture frequency leak: Macroblock leak flags are included for non-intra macroblocks.
  picture motion escape: Macroblock motion escape flags are included for non-intra macroblocks.
  picture quant escape: Macroblock quantizer escape flags are included at macroblock layer.
  tcoef escape format: When on, indicates the 12-bit escape mode is used in the picture rather than the MPEG-I 20,28 bit escapes. This has already been proposed as an addition to MPEG.
  intra dc format: When on, indicates 9-bit precision is used for intra DC coefficients. This has already been proposed as an addition to MPEG.
  load intra quantizer matrix: Moved from sequence layer. If on, the intra quantizer matrix follows as the next 64 bytes.
  load inter quantizer matrix: Moved from sequence layer. If on, the inter quantizer matrix follows as the next 64 bytes.

For 'P' pictures, a field leak and field leak modifier are also transmitted. The field leak is decoded as in Table 2. The leak modifier is a six bit unsigned number.

Slice Layer—The last 8 bits of a slice start code indicate the vertical position in macroblock units of the first macroblock in a slice. For the first macroblock in a slice, its absolute address in macroblock units from the left edge of the picture is transmitted in the macroblock address field. These two numbers (slice vertical position and macroblock address) taken in conjunction uniquely identify the macroblock in the image and provide a mechanism for resynchronizing after errors.

In MPEG-EP we could restrict slices to start at fixed positions in the image. Instead of transmitting the slice vertical position, we transmit a unique slice number that identifies the slice (Note: the slice start codes for MPEG limit us to 175 slices/picture. This should be enough for most applications). One possible choice of starting slice positions, would be to allow two equal sized slices per picture width. For a frame picture we then have a total of 60 slices/picture. If greater error robustness is desired, this could be doubled to four slices/picture width (for 704 image sizes).

As far as the macroblock address is concerned, we could take one of several approaches:

Do away with it entirely, by not allowing macroblock skipping. Note B pictures are not allowed in MPEG-EP, and skipping may not be a very useful option for leaked P pictures.
  Transmit the address of the first coded macroblock as a relative offset from the left edge of the slice, not the frame.
  Leave it as it is. In this case, the decoder can use it as a check to see if it really is where it thinks it is, i.e. to detect undetected channel errors.

This alternative has not been included in the syntax, because we are not sure if the overhead reduction is worth the incompatibility with current MPEG syntax.

Macroblock Layer—The macroblock address, and type are coded just as they are for MPEG-I. A number of optional fields follow. For motion compensated blocks in frame pictures, a 1 bit flag indicates whether the motion compensation used is frame based, or field based. For coded macroblocks in frame pictures, another 1 bit flag dct type indicates whether frame or field DCT's are used in the coding of the macroblock. Next the quantization is transmitted if so indicated in the macroblock type. Motion vectors, if any, follow the quantization. There may be two motion vectors for the case when field motion compensation is used in a frame structure. For non-intra blocks, the leaked macroblock and macroblock motion escape flags indicate the presence or absence of the macroblock leak and 8×8 block motion vectors respectively. Similarly, the macroblock quant escape flag indicates the presence/absence of 8×8 quantizer values. If the macroblock is coded (intra blocks are always coded), then the selection vectors are transmitted for each macroblock.

If 16×8 subdivision of blocks is enough, then the 8×8 motion escape mode can be eliminated, while sending a field motion type flag in place of the frame motion type flag of frame pictures. If field motion type was set it would indicate that two motion vectors were transmitted for the macroblock, one for the top half and one for the bottom half. The motion_vectors() routine could easily be modified for this.

Block Layer—The selection vectors are used to index into pattern tables to identify which coefficients of block i are transmitted. Transmitted coefficients are decoded using separate luma/chroma coefficient VLC tables.

Other Considerations

Frame-Based vs. Field-Based Coding—This memo describes an entertainment profile, that permits a great deal of flexibility in the encoding process. In particular, the encoder is free to switch between field-based coding and frame-based coding at picture boundaries. If the ability to handle both forms of coding is very expensive, or impossible to provide given the time constraints on the current project (chip delivery 5/93), we may want to select one of these two forms of coding. Frame-based coding requires slightly more memory than a pure field-based coder (may need more for handling 3:2 pulldown), but does permit local switching between frame/field prediction and frame/field DCT coding adaptively. The disadvantage, of course, is that the temporal prediction uses fields which are at least 1/30th of a second apart in time, while field coding allows temporal prediction between fields 1/60th of a second apart in time. At this point in time, we need to know more about relative merits of the two approaches in terms of picture quality to select between them.

Memory Requirements—A purely field-based system with no B pictures, should need only a single frame of memory at the decoder. This does not include other memory needed for the rate buffer, VLC tables etc. For frame-based coding the memory needed is 1.5 frames in a straightforward implementation, but with a some ingenuity in the address generation it may be possible to bring this down closer to a single frame.

If the motion range is pmN pixels in the vertical direction, then it may be possible to decode a sequence with 1 frame +N+16 lines of memory. While a new frame is being decoded the first N+16 lines are written to a section of memory not used to store the previous frame. Once this is done, the next row of macroblocks decoded can be overwritten over the first row of macroblocks of the previous frame, because their data will not be needed for prediction in the current frame. Actually the extra 16 lines of storage can be reduced further depending on the horizontal motion-compensation search range used. We still need to the feasibility of such a memory architecture in the face of the constraints it imposes on memory bandwidth and decoder speed. The memory is being accessed in three different ways during the decoding process: for display, for motion compensation, and for storage of the frame currently being decoded.

We still need to examine whether 3:2 pulldown can be accomplished with no additional memory in frame mode. Given these reference memory requirements, the total reference memory required for field based and frame based coding are shown in Table 5:

TABLE 5

| Memory Requirements | | |
|---|---|---|
| Field-based 4:2:2 chroma | 704 × 480 × 2 × 8 | 5.4 × 10⁶ bits |
| Frame-based 4:2:2 chroma | 704 × 480 × 3 × 8 | 8.1 × 10⁶ bits |
| Field-based 4:2:0 chroma | 704 × 480 × 1.5 × 8 | 4.1 × 10⁶ bits |

TABLE 5-continued

| Memory Requirements | | |
|---|---|---|
| Frame-based 4:2:0 chroma | 704 × 480 × 2.25 × 8 | 6.1 × 10⁶ bits |

Note: Table 5 assumes 1.5 frame storage, when frame based coding is used.

TABLE 6

| Memory Requirements | | |
|---|---|---|
| Field-based 4:2:2 chroma | 704 × 480 × 2 × 8 | 5.4 × 10⁶ bits |
| Frame-based 4:2:2 chroma | 704 × (480 + 48) × 2 × 8 | 5.9 × 10⁶ bits |
| Field-based 4:2:0 chroma | 704 × 480 × 1.5 × 8 | 4.1 × 10⁶ bits |
| Frame-based 4:2:0 chroma | 704 × (480 + 48) × 1.5 × 8 | 4.5 × 10⁶ bits |

Note: Table 6 assumes a vertical search range of ±32.

Film Mode—In field mode, we can handle 3:2 pulldown through the use of a repeat field flag and no additional memory. We need to examine whether we can do the same in frame picture mode.

Error Concealment—Error concealment issues lie outside the scope of MPEG-EP, and are being addressed at the transport layer.

Support of p*64 Protocol—A field added at picture layer or sequence layer, can be used to indicate the to the receiver that the incoming stream is a H.261 bitstream. In this case the decoder can assume that the following bits represent one picture (field) coded using the H.261 protocol.

We claim:

1. A decoder including a combiner responsive to applied input signals, a frame buffer responsive to said combiner, a motion compensator responsive to said frame buffer and to applied motion vector signals, and a multiplier responsive to applied frame leak signals and to modified prediction signals for developing an output signal applied to said combiner, characterized by:
   modification means responsive to said motion compensator and to applied adaptive macroblock leak signals for developing said modified prediction signals.

2. The decoder of claim 1 wherein said applied input signals include segments representative of video frames, the frame leak signals include a signal for each video frame, and the adaptive macroblock leak signals include a signal for each of specified subdivisions of a frame.

3. The decoder of claim 1 wherein the input signal segment representative of a video frame comprises a single field of progressive scans.

4. The decoder of claim 1 wherein the input signal segment representative of a video frame comprises two interlaced fields.

5. The apparatus of claim 1 wherein said modification means comprises a transform circuit responsive to said motion compensator, a gating template responsive to said transform circuit and to said adaptive macroblock leak signals, and an inverse transform circuit responsive to said gating template.

6. The apparatus of claim 5 wherein said transform circuit operates on 2×2 blocks of pixels to form 2×2 blocks of transform elements, and said gating template is responsive to signals which specify a treatment for 2×2 blocks of transform elements.

7. The decoder of claim 6 wherein the treatment specifies a member of a predefined set of treatments which includes at least the following:

(1) K,K,K,K;
(2) D,D,D,D;
(3) K,K,K,D;
(4) K,K,D,D;
(5) K,D,K,D; and
(6) K,D,D,D;

where the first element in the treatment corresponds to the upper left-hand element in the 2×2 block of transform elements, the second element in the treatment corresponds to the upper right-hand element in the 2×2 block of transform elements, the third element in the treatment corresponds to the lower left-hand element in the 2×2 block of transform elements, and the fourth element in the treatment corresponds to the lower right-hand element in the 2×2 block of transform elements, and where K specifies transferring the corresponding transform element to the output of the gating template and D specifies blocking the corresponding transform element from the output of the gating template.

8. The decoder of claim 1 wherein said modification means is implemented by at least one microprocessor.

* * * * *